United States Patent Office 3,139,342
Patented June 30, 1964

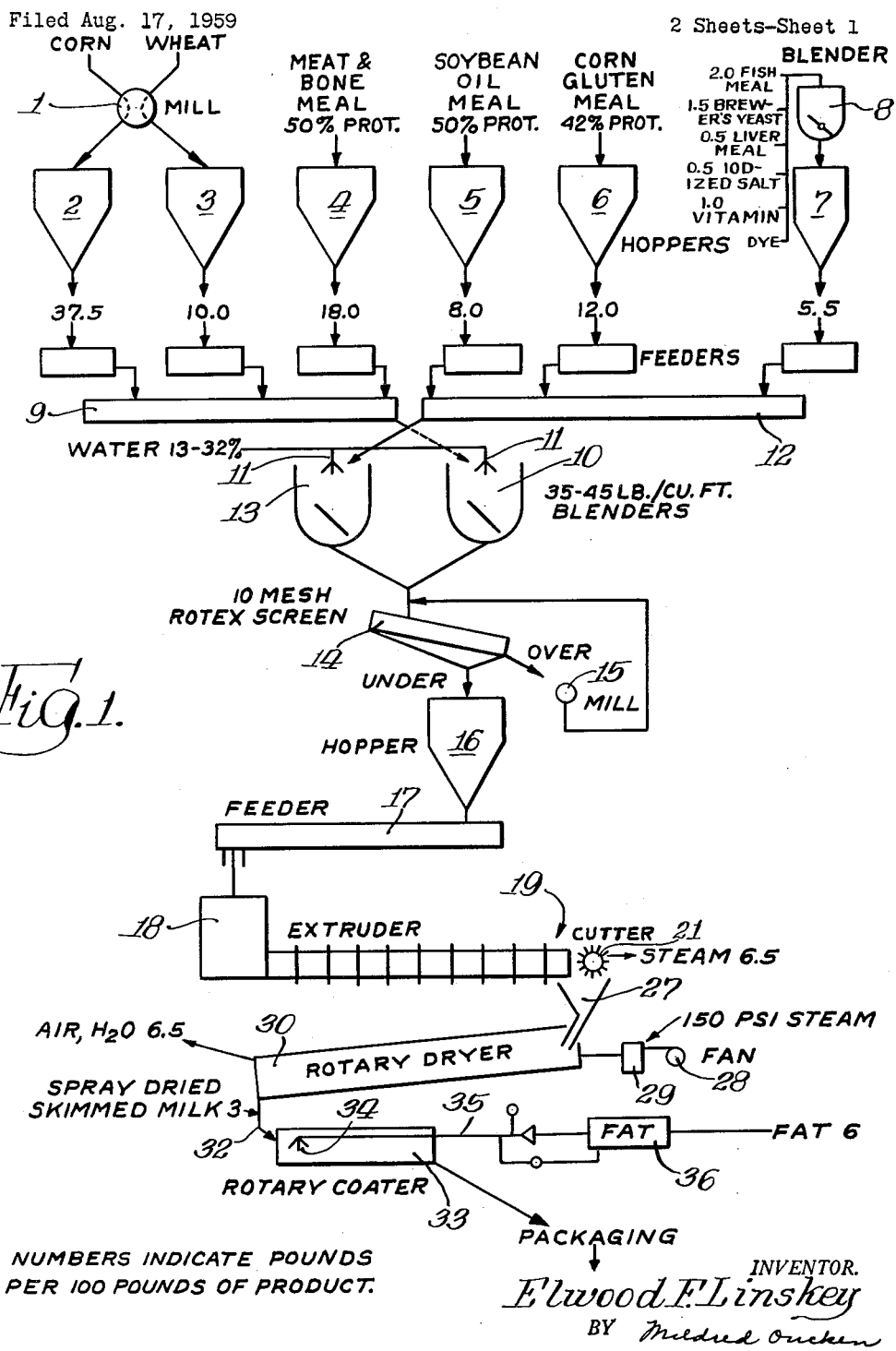

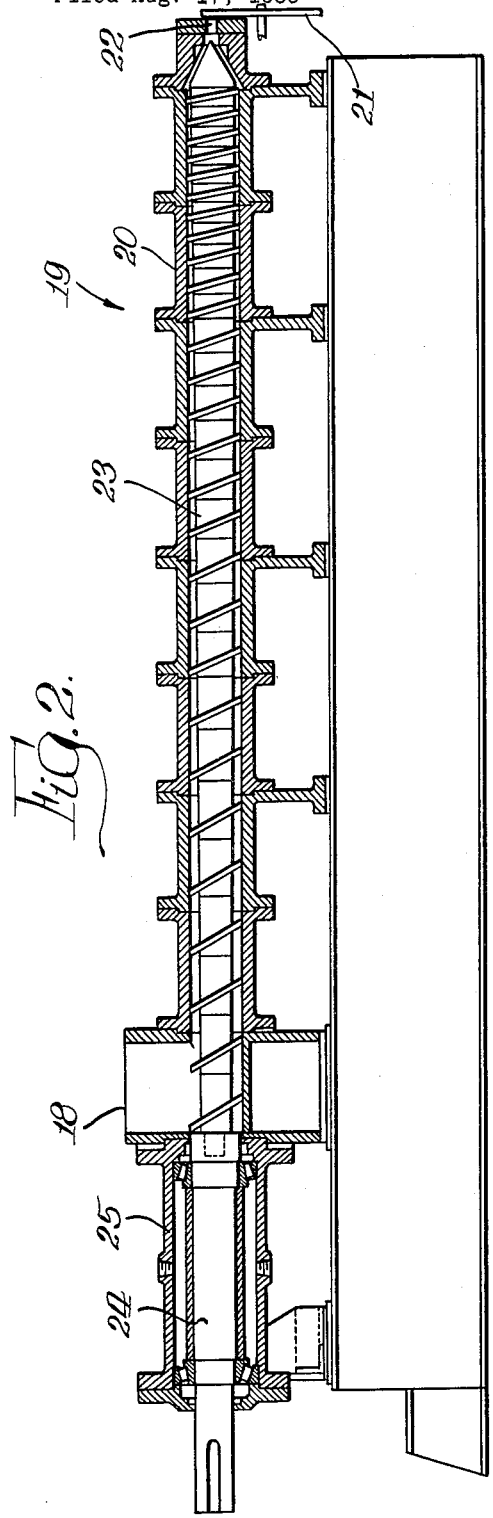
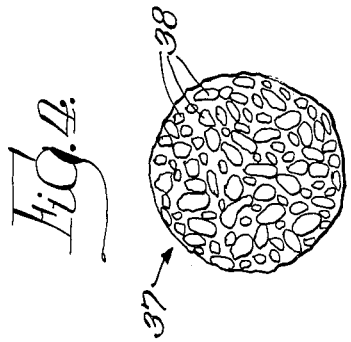
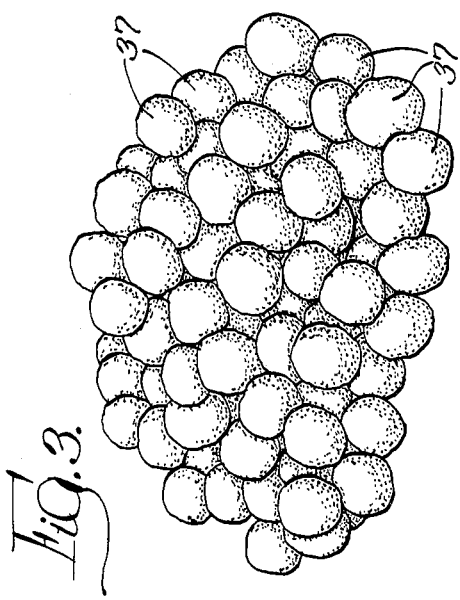

3,139,342
ANIMAL FOOD PROCESS
Elwood F. Linskey, Argo, Ill., assignor to Corn Products Company, New York, N.Y., a corporation of Delaware
Filed Aug. 17, 1959, Ser. No. 834,205
4 Claims. (Cl. 99—2)

The present invention relates to animal food, more particularly to dog food, and is concerned with a new animal food and process of making the same.

A dog food should have a composition which fulfills the nutritional and taste requirements which are inherent in the problem. Additionally, it should embody the ingredients which supply nutritional and taste requirements in a physical form which is attractive. Dog foods are known which are compounded of starch-bearing materials, usually in the form of pre-cooked cereals, protein supplying materials, fats and vitamin and mineral supplements. In some cases, small amounts of additional flavoring agents, coloring agents, preservatives, and so forth are added.

It is an object of the present invention to prepare a dog food containing the necessary nutritional and taste requirements in a novel and attractive physical form and to provide a novel and advantageous process for preparing the same. I have conceived the desirability of embodying the materials containing the essentials of nutrition and taste in the form of small pellets of generally spherical form of a diameter of from about 1/16" to about 3/4". The surface of the pellet is relatively smooth and rounded, and is substantially free of dust or dust-producing projections. The interior of the pellet is cellular. It is produced in that form by virtue of the sudden release of external pressure upon small masses of the compressed material in a moist and heated condition. The steam puffs the small mass and causes it to assume a convex, rotund form. It is relatively smooth with some surface irregularities on the outside and highly porous on the interior. It then has a bulk density of about 15 to 21 pounds per cubic foot.

Upon the relatively smooth surface there may be deposited, with considerable accuracy as to amount added, various taste enhancing and/or nutrition supplementing materials as coatings. The pellets may be coated with material which is desirably a part of the finished product but which should not be subjected to the heat involved in the passage through the extruder. Thus a Vitamin A supplement may be added as a coating after the forming and drying operations. So also may be added coatings of color, flavor, etc. Upon wetting the product tends to hold its form and does not disintegrate and go into suspension. Neither does it swell or contract to any appreciable extent. The physical form of relatively hard skin or surface with cellular porous interior which the pellet exhibits makes the pellet pleasant to chew. It is crisp and brittle and yet does not crumple into dust, on the one hand, or splinter, on the other.

This form is further of advantage because it practically eliminates the problem of dust formation in either the manufacturing operation or in the shipping or in use. At the same time, it pours freely and does not create dirt if spilled or dropped on the floor. It is easily picked up or readily brushed aside cleanly. In the specific example herein disclosed in detail, the pellets are highly digestible, approximately 77 to 78 percent, and a firm well-formed stool is produced. Above all, dogs like it, as comparative tests have proven.

In addition of the starch-bearing material, pre-cooked cereals which are commonly used in the prior art, are not here employed, but raw cereal grains supply the requirement.

The desired fat component is added after the cooking, extrusion and expansion operation, by a hot fat coating operation whereby the fat content lies mainly on and in the surface layers of the pellets.

The raw feed grain is mixed with the protein-bearing ingredients before said grain is subjected to the cooking operation. The cooking operation is performed in the extruder by the heat of the mechanical working of the extruder which kneads the material together and heats the same. This is performed in a period of about two minutes. At the same time, the material is thoroughly churned and kneaded and plasticized for entrapment of the steam which is formed upon the sudden release of pressure when the material is extruded through the orifice of the machine. The issuing stream of material is cut by a rotating knife at the exit end of the orifice into short lengths of approximately the same length as the diameter of the expanded stream, for example 1/4" to 1/2". The issuing stream, which is in one example of about 1/4" diameter in the orifice, expands to from 3/8" to 1/2" in diameter in the expanded pellet. The expanded size depends upon the size of the orifice, other things being the same. Sufficient moisture is added to the mix, preferably 13 to 32 percent, to permit plasticization within the extruder. The hot plastic material will readily expand or puff upon sudden release of pressure. The expanded pellets lost a substantial part of their moisture content in the expansion and cooling, and then are subjected to a drying operation in a rotary kiln dryer where the pellets are tumbled with a blast of air carrying off the moisture. Other dryers, such as a belt dryer, may be used. The rounded form of the pellets is advantageous.

The temperature for flashing the moisture of the material into steam is preferably held between about 220° and 260° F. Satisfactory samples of the prdouct have been produced at flash temperatures as high as 340° F.

The process and product are not confined to a specific dimension of the orifice of the extruder nor of the expanded product. With a 4" diameter barrel of the extruder I have successfully employed orifices of 1/8", 3/16", 1/4" and 3/8" diameter and a multihole die with four 1/8" diameter orifices. A larger barrel, for instance 8" diameter, may supply a 3/8" diameter orifice and produce a larger diameter extruded pellet of say 1/2" to 5/8". The ratio of barrel diameters to orifice diameter is not to be limited to the figures here given. Larger or smaller diameter orifices can be used with appropriate adjustment of extruder operating conditions.

Now in order to acquaint those skilled in the art with the manner of practicing our invention, we shall describe, in connection with the accompanying drawings, a specific method and product.

In the drawings:

FIGURE 1 is a flow diagram indicating a specific example of the assembling, blending and treatment of the ingredients to produce the final product;

FIGURE 2 is a longitudinal section of an extruder for kneading and extruding the blended material to form the pellets;

FIGURE 3 is a plan view of a collection of pellets; and

FIGURE 4 is a cross sectional view of a pellet on an enlarged scale to show the porosity of the same.

In FIGURE 1, the ingredients and the amounts of the same are indicated by appropriate legends and numerals. The numerals associated with the pieces of equipment or operations indicate the pounds per one hundred pounds of product supplied at that particular point.

Corn and wheat are ground in the mill 1 and delivered to the hoppers 2 and 3, respectively, in the proportions indicated on the drawing. Middling starch from wheat shows the greatest puffing on expansion, and ground corn is next in order of that quality. This quality is desired in the mix delivered to the extruder. Meat and bone meal containing 50 percent protein are delivered to the hopper 4. Soya bean oil meal containing 50 percent protein is charged into the hopper 5. Corn gluten meal containing 42 percent protein is charged into the hopper 6, and the hopper 7 is charged with food supplement from the blender 8. This supplement in the specific example includes 2.0 pounds of fish meal, 1.5 pounds of brewery yeast, 0.5 pound of liver meal, 0.5 pound of iodized salt, 1.0 pound of dog vitamin and preferably sufficient dye added to the mixture to obtain from the extruder a suitably colored product. This may be a reddish brown color resembling the color of raw meat. These ingredients are blended in the blender 8 and then are delivered to the hopper 7. The blending of the various ingredients is effected as follows. Ingredients from hoppers 2 to 7 are metered into conveyors 9 and 12 in the proportions indicated on FIGURE 1. The joint discharge of material from conveyors 9 and 12 is delivered alternately to hoppers 10 and 13. As illustrated in FIGURE 1 the discharge is being delivered into blender 13 as indicated by the full line arrow.

While the ingredients are being mixed in the blender 13, or 10 as the case may be, water is added via spray nozzle 11 to raise the moisture to the desired level for extrusion.

When the mixing and moistening cycle of the contents of blender 13 is completed, the contents of that blender are discharged to the Rotex Screen 14.

While blender 13 is discharging, ingredients from conveyors 9 and 12 are fed to blender 10 as indicated by the dotted line arrow to start a new cycle.

The mixture delivered by the blenders 10, 13 will have an average bulk density of from about 35 to about 45 pounds per cubic foot. Said mixture delivered by the blenders 10, 13 will have a moisture content of about 13 to 32 percent by weight.

The moistening of the material in the blenders 10, 13 to the degree indicated on FIGURE 1 and preferably to between 20 and 23 percent permits plasticization within the extruder 19 and provides the necessary moisture to be flashed into steam to produce the puffing or expanding operation. By way of example, material of a water content of approximately 20 to 23 percent when it enters the extruder 19 will lose about 6.5 pounds of water per 100 pounds of product by flashing off when it is extruded.

The material rejected by the screen 14 is sent through mill 15, and returned to the top of the screen. Material passing through the screen 14 enters the hopper 16. From the hopper 16, the material passes by way of the automatic feeder 17 to the intake 18 of the extruder 19. The extruder 19 is shown diagrammatically in FIGURE 1 and is shown in longitudinal section in FIGURE 2. It comprises three main parts, the drum or barrel portion 20 with orifice 22 and inlet 18. The second part is the longitudinally extending screw 23, which is contained in the barrel, and which is connected to a rotatable shaft 24 mounted in bearings in a bearing frame 25. The screw and drum are shown as sectional. This is optional.

The shaft 24 is adapted to be driven by a suitable driving gear, not shown. The pitch of the screw 23 is graduated so as to decrease the displacement of the material per turn of the screw as the material approaches the orifice 22. The orifice is served on the inside by the screw 23 which forces material through the orifice to the outside.

The third main part involved in forming the pellets is the multiblade cutter or knife 21 which is continuously driven during operation of the extruder by means not shown. The exit end of the orifice is served by said rotating multiblade knife 21 which cuts the issuing stream into short lengths of approximately the diameter of the orifice, so that when each separated piece is expanded fully by flashing of the contained moisture into steam, the small mass thus severed tends to assume a spherical shape and to increase in total volume by the expansion of the steam bubbles inside of the same.

The extruder shown in FIGURE 2 is a 4" diameter extruder having a ¼" outlet orifice at 22. Obviously, a smaller diameter orifice may be served, and also if the diameter of the barrel and screw be increased for the handling of more material, the size of the orifice or the number of orifices may be increased. Thus, for instance, with an 8" barrel, a ⅜" orifice may well be served. The preferred diameter of ¼" of the orifice on the 4" extruder shown in FIGURE 2 results in an expanded product of a diameter of from ⅜" to ½" and of a spheroidal or generally spherical shape. At all events, the pellets thus produced are found to produce very little dust during production or treatment or in handling or subsequent shipping and use. Dust, in addition to being a nuisance, appears to have an unfavorable effect upon feeding, and apparently interferes with taste. The ability to produce a product substantially free of dust is an important desideratum.

The expanded pellets from the extruder 19 are exposed to the air to permit of free expansion and the escape of steam. They are then passed through a funnel 27 into a rotary drum or other suitable form of dryer. The pellets lose about 6.5 pounds of steam per 100 pounds of the product at the outlet end of the extruder 19.

In passing slowly through the rotary dryer 30, which is an inclined rotating drum with a blast of air delivered therethrough from the fan 28 through a heater 29, the pellets lose a further 6.5 pounds of moisture per 100 pounds of product. The air from the fan 28 passes through the heater 29 which is heated by steam at about 150 pounds per square inch. From the rotary dryer 30, the pellets with an additive of spray dried skimmed milk in the proportion of about 3 pounds per 100 pounds of the product are conveyed by the conveyor line 32 to the rotary coater 33. Other forms of coater may be employed. After the extrusion and drying operation, there may be added as a coating or a part thereof such materials as Vitamin A supplement which might be injured or destroyed by being subjected to the extrusion operation. Other coatings or flavor, color, etc., may also be added. Such coating operation may precede coating with fat or may follow the same. The firm, relatively smooth surface of the pellets lends itself well to such coating treatment. The rotary coater 33 is a rotating drum at the inlet end of which there is a spray head 34 supplied with fat in liquid form through the pipe 35 from the supply tank 36. In this operation, about 6 pounds of fat per 100 pounds of product are added to the pellets. This is applied substantially as a coating. From the rotary coater 33, in which the fat is supplied at a temperature slightly higher than the melting point, the pellets are delivered to a packaging machine (not shown). Here the pellets are boxed in cardboard boxes or bagged in suitable bags ready for the shelf of the retailer.

In the specific example employing the ¼" orifice, the resultant product is approximately spherical, ⅜" to ½" in diameter. It has a bulk density of between 15 to 22 pounds per cubic foot. It has as finished, with the aid of coloring material such as a dye, an attractive color, somewhat resembling raw lean meat or slightly darker. Alteration of the natural color which is light brown or buff is optional.

Analysis of the formula as shown in the flow diagram on a typical batch is as follows, as taken at two moisture levels: (Moisture is lost at the outlet end of the extruder 19).

| Moisture | percent | 8.3 | 10 |
|---|---|---|---|
| Protein | do | 27.1 | 26.6 |
| Crude fat | do | 7.7 | 7.6 |
| Crude Fiber | do | 2.6 | 2.5 |
| Ash | do | 7.6 | 7.5 |
| Starch | do | 29.9 | 29.3 |
| NFE | do | 46.7 | 46.7 |
| Bulk Density | lb/cu. ft. | 19.4 | 19.8 |

The factors which govern extrusion and subsequent puffing involve the requirement for sufficient moisture to make the material plastic and to supply the medium for vapor expansion to produce the expanded cellular structure. The temperature and pressure are of course essential to the puffing operation, since without temperature in excess of 212° F. there would be no flashing into steam and without pressure the moisture would pass into steam without any sharp pressure release, and consequently without a certainty that the puffing operation would result in a cellular structure. Pressures in the extruder 19 in excess of that required to prevent passing of the water into steam are significant chiefly in governing the rate of discharge through the orifice 22.

The puffing action is chiefly due to the starch-bearing materials. With the preferred formula exhibited on FIGURE 1, the ground corn and wheat are almost wholly responsible for puffing or expansion. If one removes non-starch-bearing ingredients, such as corn gluten meal, meat and bone meal, fish meal, liver meal and soya bean oil meal from the formula, puffing is increased. The presence of non-starch components, however, results in a more rigid product, and the formula actually to be employed is preferably that wherein the starch-bearing materials constitute about one-half of the formula, and the protein-bearing materials and supplements constitute about an equal or slightly less amount of the formula. The added water is needed for plasticizing and steam flashing purposes.

The material in the extruder is heated, plasticized and cooked by the mechanical action of the screw. Temperatures of 212 to 340° F. and pressures in the range of 100 to 2000 p.s.i. have been measured in the barrel of the machine during successful production of the product. The moistened mix is forced through the barrel and out the orifice in a matter of about two minutes during which time it is heated, plasticized and cooked by the mechanical action of the screw. The above pressures, temperatures, times and moisture content may be varied.

The product shape and size are determined by the size of the orifice and the speed of the multiple blade cutter 21 located at the dicharge or orifice end of the extruder. As the cooked dog food discharges through the orifice, the steam expands in the plastic mass to make a cellular expanded product. The multiple knife cutter 21 reduces the extrusions to short lengths, which, after expansion, are approximately round pieces of between 0.375 and 0.5 inch in diameter. The product may be produced in other sizes.

FIGURES 3 and 4 show a typical product.

FIGURE 3 shows a mass of the extruded expanded pellets 37 produced by the process above described. The spheroidal contour is apparent. The surface textile exhibits small pits or cavities (not shown) due to the expansion.

FIGURE 4 shows a pellet in cross section, and on an enlarged scale, and illustrates the cellular texture produced by flashing of the moisture into steam bubbles which produce voids 38 in the finished product. The bubbles or voids 38 in the pellets of about ⅜" to ½" diameter produced on a ¼" die with the materials above stated run mainly about .05" in diameter. They may be larger or smaller or of mixed size.

The use of ground grain as such, instead of cooked starch products as the starch containing ingredient, reduces the cost of the product. The process produces a dustless dog food of low bulk density. Dogs like it, and can assimilate it. Also a well formed stool is produced. This is of advantage particularly for dogs kept in close quarters.

I do not wish to be confined to the precise limits herein stated except as they are required by limitations in the appended claims.

I claim:

1. The process of forming a food product, which comprises, blending a raw and unheated food mix which contains approximately 50 percent by weight of cereal grain and approximately 50 percent by weight of combined protein and mineral containing material and having a moisture content of not less than approximately 10 percent, delivering said mix to an enclosed space of substantial length, forcing said mix through said space and extruding it directly into an orifice at one end of said space at a decreasing rate of travel of said mix and under increasing pressure and friction on said mix as it travels to said orifice by means of a screw, the pitch of which is graduated so as to decrease the displacement of the mix per turn of the screw as the mix approaches the orifice, to plasticize the mix and heat it to a temperature in excess of 212° F. ahead of said orifice and effective for cooking the mix and converting the water content thereof to water vapor and without expansion of the water vapor ahead of said orifice, extruding the cooked mix to atmosphere through said orifice in cylindrical form, completely filling said orifice while maintaining said mix confined against expansion until leaving said orifice and entering the atmosphere, and cutting the cooked mix as it is extruded in cylindrical form through said orifice into lengths, said cut lengths of said mix being expanded into pellets of generally globular form and to cellular texture internally by expansion of the water vapor trapped therein, incident to release of pressure on the mix as same enters the atmosphere.

2. The process of claim 1, wherein the cooked mix as it is extruded in cylindrical shape through the orifice is cut into lengths approximately the same as the diameter of said orifice.

3. The process of claim 1 further characterized by drying said generally globular pellets, applying a coating of milk concentrate to the surfaces of the pellets, and contacting the surfaces of said pellets with hot animal fat.

4. The process of claim 1 further characterized by drying said generally globular pellets, applying a coating of milk concentrate to the surfaces of the pellets, and contacting the surfaces of said pellets with hot animal fat, and wherein the generally globular pellets are rolled during the drying and coating steps.

References Cited in the file of this patent

UNITED STATES PATENTS

| 2,120,138 | Mathews et al. | June 7, 1938 |
|---|---|---|
| 2,168,532 | McMath | Aug. 8, 1939 |
| 2,489,267 | Chapin et al. | Nov. 29, 1949 |
| 2,774,670 | Albert | Dec. 18, 1956 |
| 2,853,027 | Graves | Sept. 23, 1958 |